Figure 1:
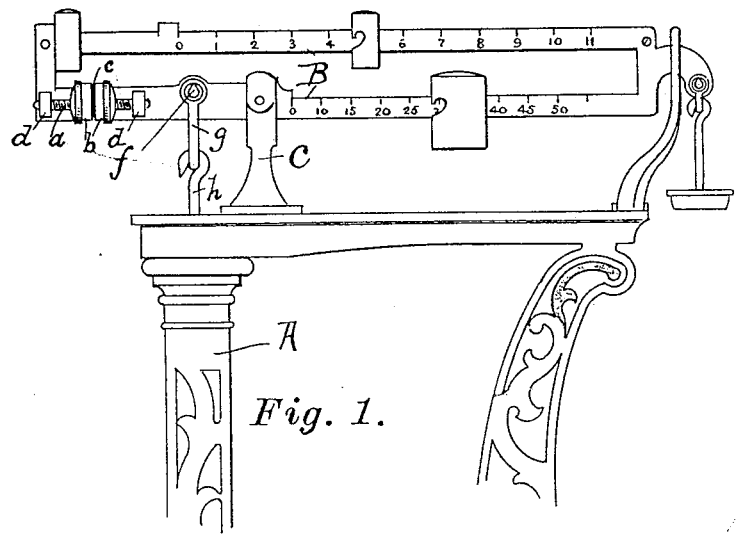

(No Model.)

C. A. HEYER.
WEIGHING SCALE.

No. 534,829. Patented Feb. 26, 1895.

WITNESSES:
Gales P. Moore
Edgar N. Brandenburg

INVENTOR
Charles A. Heyer
BY Chas. S. Stuntevant
ATTORNEY.

UNITED STATES PATENT OFFICE.

CHARLES A. HEYER, OF ST. JOHNSBURY, VERMONT, ASSIGNOR TO THE E. & T. FAIRBANKS & COMPANY, OF SAME PLACE.

WEIGHING-SCALE.

SPECIFICATION forming part of Letters Patent No. 534,829, dated February 26, 1895.

Application filed November 13, 1894. Serial No. 528,671. (No model.)

*To all whom it may concern:*

Be it known that I, CHARLES A. HEYER, a citizen of the United States, residing at St. Johnsbury, in the county of Caledonia, State of Vermont, have invented certain new and useful Improvements in Weighing-Scales, of which the following is a description, reference being had to the accompanying drawings, and to the letters of reference marked thereon.

My invention relates to an improvement in weighing scales and especially to means for balancing the scale without a load, devices for this purpose being ordinarily known as balance balls.

It is customary to provide the short arm of the beams of certain classes of scale with an adjustable ball to properly balance it, but it is well known that considerable inconvenience sometimes arises from persons thoughtlessly rotating the ball or balance, or, it may be, some shock will cause it to be accidentally displaced. To overcome this objection, it has heretofore been proposed either to use a friction or to provide a set screw, or a check or jam nut for the ball. The friction method is open to the objection that, if sufficient to secure the ball against jarring and thoughtless handling, it will be inconveniently hard to work in balancing the scale, while, in the use of a set screw or a check or jam nut, additional parts, as well as tools, are required to enable them to be operated.

The object of my invention is to provide a simple and effective device whereby the balance ball of a weighing scale may be held in any desired position along its line of travel, with such pressure as to prevent displacement under a jar or shock, or under any careless handling of the ball itself. At the same time, however, the device is so constructed that, by the exercise of sufficient force, it may be disengaged from one point and secured at another without requiring the use of any tools or appliances external to the ball itself.

My invention comprises a balance ball consisting of three parts, two solid and one flexible, in such relation to each other and to the support, upon which said parts are arranged, that a change in the distance between the solid parts of the ball will, through compression or distention of the flexible part, cause it to bind upon the support, which the ball traverses, the relation of the parts being such that, under a certain degree of tension between the solid and the flexible parts, they will all move together as one mass, the flexible part serving to unite them, while the tension is not sufficient to prevent their being readily moved along the shaft, so that the ball may be quickly adjusted to a proper position to balance the scale; but, when the ball has been moved to its proper position, bringing the parts still closer together, will cause a strong binding pressure, thus preventing any movement of the ball.

Secondly, it consists of the two outer parts movable along a suitable support, and a flexible central member also arranged on said support adapted to unite the two outer members and, under pressure, to hold them rigidly in position on their support.

Finally, the invention consists in the matters hereinafter described and referred to in the appended claims.

Figure 2:
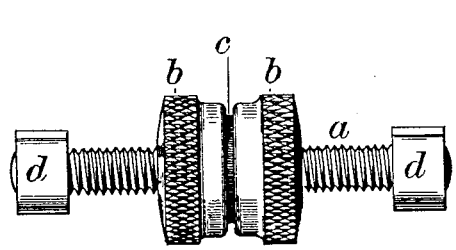
Figure 3:
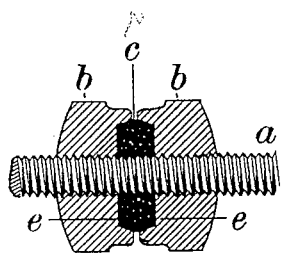

In the accompanying drawings, which illustrate the invention, Figure 1 represents my invention as applied to a scale, a sufficient portion of the latter being shown to enable my invention to be readily understood. Fig. 2 is an enlarged view in elevation of my invention; and Fig. 3 is a sectional view.

In the drawings, A represents a portion of the framework of a scale.

B is the two-part beam, of usual construction, provided with the sliding poises, the beam being pivoted on the standard C and having hung from the knife edge pivot $f$ the loop $g$ upon which is hung the steelyard rod $h$.

My balancing device for the beam comprises the lugs $d$ secured on the beam B. These lugs have an opening in which is supported at either end the threaded rod or shaft $a$.

The balance ball itself is herein shown as composed of the two cylindrical nuts $b$, $b$ mounted on the threaded shaft $a$. Each of these nuts is provided with an annular recess $e$ adapted to receive a disk $c$ of rubber or other flexible material arranged on the shaft between the two nuts, which disk $c$ fits snugly both recesses, and its thickness is preferably greater than the longitudinal depth of the socket formed by the recesses e when the nuts are placed together.

It will be seen that, as the nuts are screwed together, the bottoms of the recesses will press against the opposing sides of the flexible disk, which pressure increases the diameter of the disk and causes it to bind against the outer wall of the recess in both nuts, so that they are bound together and may be adjusted as one nut to the desired position on the shaft $a$. Increased pressure on the faces of the disk will also distend it against the shaft on which it is mounted causing it to grip the same and bind with greater or less force, as the nuts are screwed up or unscrewed, so that when the nuts have been adjusted to the proper point of balance on the shaft they may be clamped thereon securely against any careless handling.

I have found in practice that good results may be secured if the central opening in the disk be very large, so that there is no contact of said disk with the shaft, for, even under such circumstances, the pressure between the nuts will cause them to bind to a considerable extent on their threads, so that the ball will be quite firmly clamped in position.

The ball, as a whole, is easily adjusted to any desired position along the shaft and readily clamped securely. There are no screws to get lost, no wrenches or screw-drivers needed and no liability of the ball getting loose by accident.

It will be understood that, in its broadest sense, I do not desire to be limited to the precise details of construction herein shown, as various modifications and changes may be made without departing from the spirit of my invention. For example, the shaft, upon which the parts are mounted, may be smooth, and the thread to draw the nuts together, be on the nuts themselves. Again, when distended, the flexible portion of the device may be made to bind upon some fixed part external to the ball, instead of upon the shaft upon which the ball moves. Again, the ball might be composed of a greater number of parts from what I have herein shown. The flexible part of the device may be replaced at small expense in event of becoming worn.

It will be understood that my invention, in certain of its features, may be used in other connections than herewith shown and I do not wish, therefore, to limit myself to its use in combination with a scale, but desire to cover it in its application in any place where a binding device of such a nature is needed.

Having thus described my invention, what I claim, and desire to secure by Letters Patent, is—

1. A device for balancing scales and the like comprising a plurality of members arranged respectively on the same support, one of said members being flexible and adapted to be brought under pressure between two other members, whereby it clamps the device upon its support; substantially as described.

2. In combination with a suitable support, the two outer parts movable on the same, and a flexible member encircling the support and arranged between the two outer members adapted, under compression of the two outer members, to unite them so they may be moved as one and under additional pressure to bind them firmly on the support; substantially as described.

3. The herein described binding device, comprising a supporting rod or shaft, balls or nuts movable on said shaft or rod and having recesses arranged adjacent to each other, a flexible disk or ring arranged on said shaft between the two nuts or balls and adapted, when the latter are moved into engagement, to pass into the recesses and bind against the walls thereof; substantially as described.

4. The herein described binding device, comprising a supporting rod or shaft, balls or nuts movable on said shaft or rod and having recesses arranged adjacent to each other, a flexible disk or ring arranged on said shaft between the two nuts or balls and adapted, when the latter are moved into engagement, to pass into the recesses and bind against the walls thereof, said binding member being of greater thickness than the socket formed by the recesses of the balls; substantially as described.

5. In combination with the scale beams having the lugs $d, d$ secured thereto, the screw threaded rod or shaft $a$, supported by said lugs, the cylindrical balls $b$, movable on said shaft and provided with recesses, $e, e$, a flexible member $c$ located on said shaft between the balls and adapted in the movement of the latter toward each other to be crowded into the recesses and bind against the walls thereof and also against the shaft $a$; substantially as described.

6. A balancing device for scales and the like comprising two independent members movable toward and from each other and arranged on a suitable support, and a flexible member arranged between the two, and means for causing the same to bind against the other members and against their support; substantially as described.

In testimony whereof I affix my signature in presence of two witnesses.

CHARLES A. HEYER.

Witnesses:
PERLEY F. HAZEN,
ALBERT L. FARWELL.